United States Patent
Hitoe et al.

(10) Patent No.: US 8,603,620 B2
(45) Date of Patent: Dec. 10, 2013

(54) CARBON FIBER AND COMPOSITE MATERIAL

(75) Inventors: Yoshinori Hitoe, Tokyo (JP); Jun Suzuki, Tokyo (JP)

(73) Assignee: Hodogaya Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/002,064

(22) PCT Filed: Jul. 3, 2009

(86) PCT No.: PCT/JP2009/062224
§ 371 (c)(1),
(2), (4) Date: Apr. 1, 2011

(87) PCT Pub. No.: WO2010/002004
PCT Pub. Date: Jan. 7, 2010

(65) Prior Publication Data
US 2011/0171454 A1    Jul. 14, 2011

(30) Foreign Application Priority Data

Jul. 4, 2008 (JP) ................... 2008-175194

(51) Int. Cl.
*D04H 1/00* (2006.01)
*B32B 27/04* (2006.01)
*B32B 15/04* (2006.01)

(52) U.S. Cl.
USPC .......... 428/292.1; 428/293.1; 428/297.4

(58) Field of Classification Search
None
See application file for complete search history.

(56) References Cited

U.S. PATENT DOCUMENTS

| 2006/0078730 A1 | 4/2006 | Tsukada et al. | 428/364 |
| 2006/0216516 A1 | 9/2006 | Handa et al. | 428/408 |

(Continued)

FOREIGN PATENT DOCUMENTS

| CN | 101146937 | 3/2008 |
| JP | 2862578 | 12/1998 |

(Continued)

OTHER PUBLICATIONS

Search report from E.P.O. that issued with respect to patent family member European Patent Application No. 09773582.3, mail date is Nov. 2, 2011.

(Continued)

*Primary Examiner* — Jennifer Chriss
*Assistant Examiner* — Camie Thompson
(74) *Attorney, Agent, or Firm* — Greenblum & Bernstein, P.L.C.

(57) ABSTRACT

An object of the present invention is to provide a carbon fibrous structure having good dispersibility and small variations in electrical conductivity, etc., and being capable of improving physical properties such as electrical properties, mechanical properties and thermal properties by a small amount addition thereof without impairing properties of a matrix. The invention provides a carbon fibrous structure having a three-dimensional network shape and comprising carbon fibers having an average outside diameter of from 100 to 300 nm, wherein the carbon fibrous structure has a plurality of granular parts, and has at least partially a steric network structure of the carbon fibers in a state that a plurality of the carbon fibers sterically extend outwardly from the granular parts and that the extending carbon fibers are also bound with other granular parts, wherein the granular parts have a particle diameter larger than an outer diameter of the carbon fiber, and are formed in a growth process of growing a carbon material in the circumferential direction of catalyst particles used while growing the carbon material into a fibrous shape, by using at least two carbon compounds having different decomposition temperature as carbon sources, and wherein the carbon fibrous structure has a powder resistance of $0.02\Omega \cdot cm$ or less measured at a compression density of $0.8\ g/cm^3$.

11 Claims, 7 Drawing Sheets

(56) References Cited

U.S. PATENT DOCUMENTS

| | | | |
|---|---|---|---|
| 2008/0254296 A1 | 10/2008 | Handa et al. | 428/408 |
| 2011/0036829 A1 | 2/2011 | Fugetsu et al. | 219/541 |

FOREIGN PATENT DOCUMENTS

| | | |
|---|---|---|
| JP | 2004-119386 | 4/2004 |
| JP | 3776111 | 3/2006 |
| JP | 2007-138341 | 6/2007 |
| JP | 2007-238804 | 9/2007 |

OTHER PUBLICATIONS

China Office action that issued with respect to patent family member Chinese Patent Application No. 200980126040.8, dated Sep. 7, 2011 along with an english translation thereof.

U.S. Appl. No. 13/006,892 to Yoshinori Hitoe et al., filed Jan. 14, 2011.

CARBON FIBER AND COMPOSITE MATERIAL

TECHNICAL FIELD

The present invention relates to a carbon fibrous structure. Particularly, the present invention relates to a carbon fibrous structure composed of carbon fibers which are composed of tubular laminates of fine carbon sheets and have various structures. The carbon fibrous structure can be utilized as additives suitable for improving physical properties such as electrical properties, mechanical properties and thermal properties of solid materials such as resins, ceramics and metals, or additives suitable for improving physical properties such as electrical properties and thermal properties of liquids such as fuels and lubricants. Further, the present invention is to provide a carbon fibrous structure having good dispersibility and small variations in electrical conductivity etc., in a composite material.

BACKGROUND ART

Carbon fibers have been used in various composite materials because of their properties such as excellent mechanical properties and high electrical conductivity.

On the other hand, in recent years, higher functionalities have come to be required for various materials. Additives which can greatly improve properties, such as electrical, mechanical and thermal properties, of a matrix comprising solid materials such as resins, ceramics and metals, without damaging the characteristics of the matrix have been sought after. Additionally, additives which can improve physical properties of liquids, such as fuel oil and lubricants, have also been sought after.

As the carbon fibers, fine carbon fibers such as carbon nano structures exemplified by the carbon nanotubes (hereinafter, referred to also as "CNT"), have been attracting public attention in various fields.

Graphite layers that make up the carbon nano structures are materials normally comprised of regular arrays of six-membered rings whose structures can bring about unique electrical properties, as well as chemically, mechanically, and thermally stable properties. Therefore, if the foregoing properties can be made use of by incorporating and dispersing such fine carbon fibers into solid materials, including various resins, ceramics, metals, etc., or into liquid materials, including fuels, lubricant agents, etc., their application as additives can be expected.

However, on the other hand, such fine carbon fibers tend to aggregate even just after their synthesis. If these aggregates are used as-is, it may result in insufficient dispersion in a matrix, thereby leading to poor performance. Accordingly, in order to impart a desired property such as electrical conductivity to a matrix such as a resin, it is necessary that the fine carbon fibers would be added in a large amount.

Patent Document 1 discloses a fine carbon fibrous structure which comprise a three dimensional network of fine carbon fibers, each of which having an outside diameter of from 15 to 100 nm. The fine carbon fibrous structure comprises a granular part, at which the plural fine carbon fibers are tied together in a state such that a plurality of the fine carbon fibers extend outwardly from the granular part. The particle diameter of the granular part is larger than the outside diameter of the fine carbon fiber, and the granular part is formed in the following growth process: by using at least two carbon compounds having different decomposition temperatures as carbon sources, growing carbon material in the circumferential direction of a catalyst particle used as well as allowing it to undergo a fibrous growth. Further, the fine carbon fibrous structure has a resistance of $0.02\,\Omega\cdot cm$ or less measured with powder at the compression density of $0.8\,g/cm^3$. However, as is clear from the description of the Example, etc. of Patent Document 1, the outside diameter of fine carbon fibrous structure is 100 nm or less.

Patent Document 2 discloses a fine carbon fibrous structure composed of carbon fibers having an outside diameter of 100 nm or less, wherein the fine carbon fibers and granular parts are continuous, and the length of carbon fibers between two granular parts is 20 μM or less.

Patent Document 3 discloses a resin composition containing aggregates, wherein each of the aggregate is composed of mutually entangled carbon fibrils having a diameter from 3.5 to 70 nm, and wherein the aggregates possess a diameter in the range of 0.10 to 0.25 mm with a maximum diameter of not more than 0.25 mm. However, as is clear from the descriptions in the Examples, etc. of Patent Document 3, the disclosed values of the maximum diameter and diameter of the carbon fibril aggregate are characteristic values of the aggregates before incorporation into a resin.

Further, Patent Document 4 discloses a composite material comprising a carbon fibrous material incorporated into the matrix. The carbon fibrous material mainly comprises a structure comprising aggregates of carbon fibers having a diameter of 50 to 5000 nm. The mutual contacting points among the carbon fibers are fixed with carbonized carbonaceous substance. The diameter of the structure has a size of 5 μm to 500 μm. Also in Patent Document 4, the disclosed values of the structure size, etc. are characteristic values before incorporation into a resin.

Thus, developments of carbon fibers with various shapes have been made, and carbon fibers suitable for each application have been demanded. However, the carbon fibrous structures described in Patent Document 1 and Patent Document 2 have an outside diameter of 100 nm or less, and there is no disclosure therein regarding a production method without causing variations in electrical conductivity etc. obtained after addition into a resin.

Moreover, the aggregates described in Patent Document 3 are obtained by dispersing carbon fibrils under a shearing force, such as in a vibrating ball mill or the like. However, they have high bulk densities. Thus, they are not satisfactory yet as an additive for improving properties such as electrical conductivity effectively by a small amount addition.

Regarding the carbon fibrous structure described in Patent Document 4, fixing at the contacting points among carbon fibers is formed by conducting heat treatment after production of carbon fibers in a state such that mutual contacting points among the carbon fibers are formed by compression-molding the produced carbon fiber aggregates, and carbonizing organic residues such as pitch remaining on the surface of the carbon fibers, or carbonizing an organic compound added as a binder. Therefore, the fixing forces at the contacting points are weak, and the electrical properties of the structure per se cannot be considered as so good. Accordingly, in the case that these carbon structures are added to a matrix such as a resin, the contacting points are easily detached and the shape of the structure cannot be kept. For this reason, for example, it is difficult to form satisfactory conductive paths in a matrix for exerting good electrical properties, by a small amount addition thereof. Furthermore, when a binder or the like is added to fix the contacting points, followed by carbonization, it is difficult to allow the binder to attach only to the sites of the contacting points. Because the binder attaches to the whole surface area of the fibers, it is highly likely that this technique might provide only structures having large fiber diameter as a whole and poor surface characteristics.

RELATED ART REFERENCES

Patent Documents
    Patent Document 1: Japanese Patent No. 3776111
    Patent Document 2: JP-A 2007-138341
    Patent Document 3: Japanese Patent No. 2862578
    Patent Document 4: JP-A 2004-119386

SUMMARY OF THE INVENTION

Problems to be Solved by the Invention

Accordingly, an object of the present invention is to provide a carbon fibrous structure having good dispersibility and small variations in electrical conductivity, etc., and being capable of improving physical properties such as electrical properties, mechanical properties and thermal properties, without impairing properties of a matrix, by a small amount addition.

In recent years, techniques of producing a composite material comprising carbon fibers incorporated into a resin, or a sheet formed by dispersing carbon fibers in water and then drying, etc. have been put into practical use. Examples of the use thereof include trays for transporting semiconductors, planar heating elements and electromagnetic wave absorptive materials. When the area of those materials is made large, variations occur in electrical conductivity, exothermic temperature and dynamic properties, and hence a material that can stabilize the quality is desired. For this reason, the present invention also has an object to provide a carbon fibrous structure which can improve the stability of further uniform physical properties such as electrical properties, mechanical properties and thermal properties regardless of a measurement site even when it is added to a matrix such as a resin, etc.

Means for Solving the Problems

As a result of our diligent study for solving the above problems, we, the inventors of the present invention have found that in order to exert sufficient improvement of properties even with a small amount addition, it is effective that when it is kneaded with a resin or the like, the dispersibility of a carbon fibrous structure is good and the carbon fibers are mutually combined tightly without causing separation into individual fibers, thereby being retained with a sparse structure in a resin; that individual carbon fibers have as few defects as possible; and it is also effective that when added to a resin, variations in conductivity, etc. are less even when a composite material having a large area is prepared. The inventors of the present invention have reached the present invention based on these findings.

Namely, the present invention relates to a carbon fibrous structure having a three-dimensional network shape and comprising carbon fibers having an average outside diameter of from 100 to 300 nm,
    wherein the carbon fibrous structure has a plurality of granular parts, and has at least partially a steric network structure of the carbon fibers in a state that a plurality of the carbon fibers sterically extend outwardly from the granular parts and that the extending carbon fibers are also bound with other granular parts;
    wherein the granular parts that bind the carbon fibers together have a particle diameter larger than an outside diameter of the carbon fiber, and are formed in a growth process of growing a carbon material in the circumferential direction of catalyst particles used while growing the carbon material into a fibrous shape, by using at least two carbon compounds having different decomposition temperatures as carbon sources; and
    wherein the carbon fibrous structure has a powder resistance of $0.02 \Omega \cdot cm$ or less measured at a compression density of $0.8 \text{ g/cm}^3$.

The present invention further relates to the carbon fibrous structure described above, having an area-based circle-equivalent mean diameter of from 20 to 100 μm.

The present invention further relates to the carbon fibrous structure described above, having a bulk density of from 0.001 to $0.05 \text{ g/cm}^3$.

The present invention further relates to the carbon fibrous structure described above, having $I_D/I_G$ determined by Raman spectroscopy of 0.2 or less.

The present invention further relates to the carbon fibrous structure described above, having a combustion initiation temperature in air of 800° C. or higher.

The present invention further relates to a composite material comprising a matrix and aggregates of the carbon fibrous structure described above incorporated into the matrix in an amount of from 0.1 to 50% by mass based on the total mass.

The present invention further relates to the composite material described above, wherein the matrix comprises at least an organic polymer.

The present invention further relates to the composite material described above, wherein the matrix comprises at least an inorganic material.

The present invention further relates to the composite material described above, wherein the matrix comprises at least a metal.

The present invention further relates to the composite material described above, wherein the matrix further comprises at least one additive selected from the group consisting of metal fine particles, silica, calcium carbonate, magnesium carbonate, carbon black, glass fibers and carbon fibers.

Effect of the Invention

In the present invention, the three dimensionally configured carbon fibers having an average outside diameter of from 100 to 300 nm are tightly bound with each other by granular parts formed in a growing process of the carbon fiber so that the carbon fibrous structure has a shape such that a plurality of the carbon fibers extend outwardly from the granular parts. Therefore, in the case that the carbon fibrous structure is incorporated into a matrix such as a resin, the carbon fibrous structures readily disperse therein, while maintaining a bulky structure. The carbon fibers can be arranged in a matrix with uniform spread even by a small amount addition thereof. Thus, since the carbon fibers can be uniformly dispersed and distributed over the whole matrix, regarding electrical properties, for example, good electrical conductive paths are formed throughout the whole matrix even with a small amount addition, and the electrical conductivity can be improved. Furthermore, regarding mechanical properties, thermal properties and the like, since fillers comprising the carbon fibers are evenly distributed over the whole matrix even with a small amount addition, the properties can be improved.

MODE FOR CARRYING OUT THE INVENTION

The present invention is described in detail below with reference to preferred embodiments.

Figure 3:
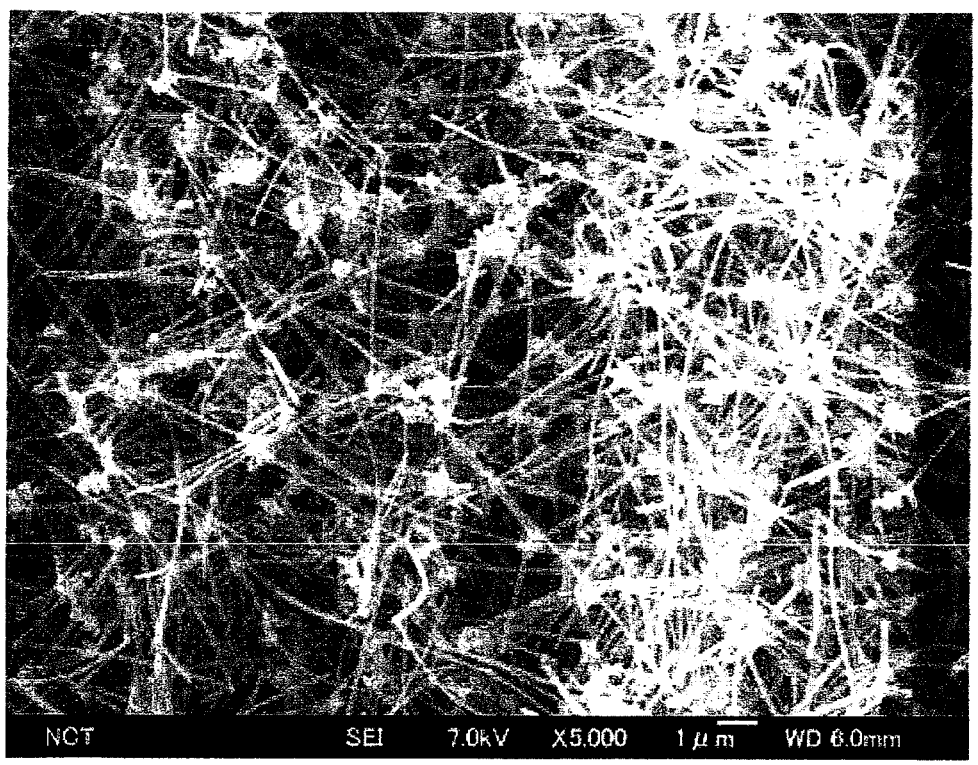
FIG. 3 is a SEM photograph of a first intermediate of the carbon fibrous structure according to the present invention.
Figure 4:
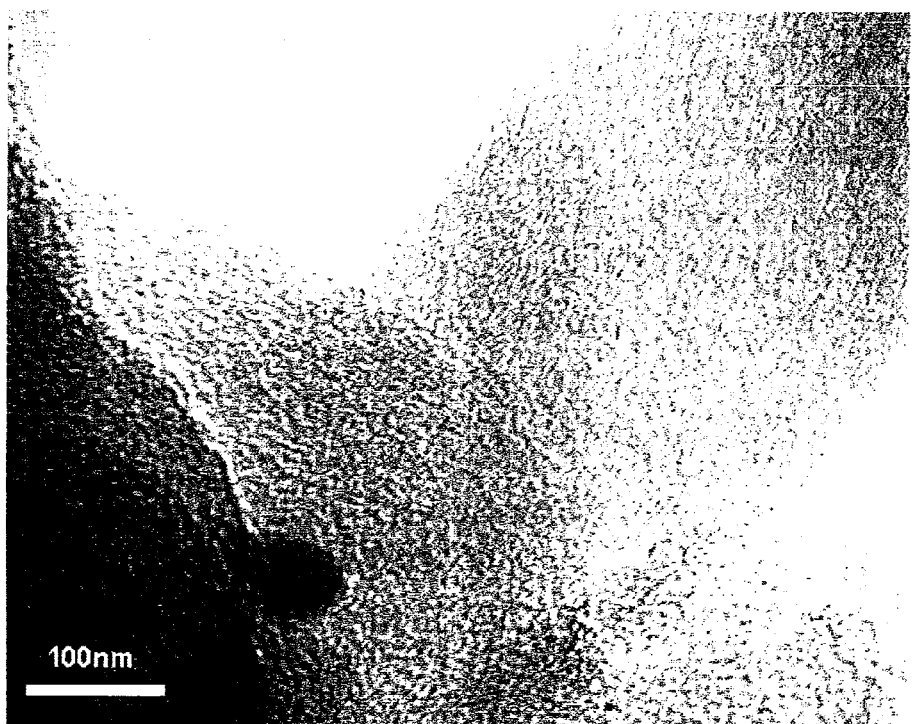
FIG. 4 is a TEM photograph of a first intermediate of the carbon fibrous structure according to the present invention.

The carbon fibrous structure according to the present invention is a three-dimensional network-shaped carbon fibrous structure composed of carbon fibers having an average outside diameter of from 100 to 300 nm as can be seen, for example, from the SEM photograph shown in FIG. 3 or from the TEM photograph shown in FIG. 4. The carbon fibrous structure is a three-dimensional network-shaped carbon fibrous structure having a plurality of granular parts and at least partially having a steric network structure of the carbon fibers in a state that a plurality of the carbon fibers sterically extend outwardly from the granular parts and that the extending carbon fibers are also bound with other granular parts.

The granular part which is a bonding portion of a plurality of the carbon fibers has a multilayer structure of graphene sheets common to the carbon fibers, thereby tightly binding the carbon fibers with each other. The outside diameter of the granular parts is greater than the average fiber outside diameter of the carbon fibers by 1.3 times or more.

The granular part which is the bonding portion of a plurality of the carbon fibers is formed by allowing a carbon substance to grow in a circumferential direction of reaction catalyst particles by using at least two carbon compounds having different decomposition temperatures as carbon sources in the growth process of the carbon fiber to form the granular part.

The reason that the average outside diameter of the carbon fiber composed of the carbon fibrous structure is in a range of from 100 to 300 nm is as follows. If the average outside diameter is less than 100 nm, variations in electrical conductivity, etc. become large when the carbon fibers are added to a resin as described below. Furthermore, the smaller the outside diameter of the carbon fibers is, the larger its specific surface area is and hence dispersion tends to be hardly effected. Therefore, for attaining uniform dispersion, it becomes necessary to make the dispersion conditions strong. In such a case, the carbon fibrous structure is likely cut during kneading into a resin. As a result, it becomes hard to form conductive paths, and the electrical conductivity commensurate with the addition amount of the carbon fibrous structure may not be exhibited. On the other hand, where the average outside diameter is 300 nm or greater, the number of carbon fibers per unit amount is extremely decreased, and hence a composite material having high electrical conductivity cannot be obtained by a small amount addition thereof. In view of this, the outside diameter is preferably from 100 to 300 nm to reduce variations and achieve high electrical conductivity. More preferable outside diameter is in a range of from 105 nm to 200 nm.

In the carbon fibrous structure according to the present invention, carbon fibers having such a predetermined outside diameter are present in a three dimensional network form. These carbon fibers are bound together by granular parts produced in a growth process of the carbon fibers so as to form a shape that a plurality of the carbon fibers sterically extend outwardly from the granular parts. Thus, since the carbon fibers are not only entangled with each other, but are also tightly bound together at the granular parts, when added to a matrix such as a resin the structure can be incorporated and dispersed into the matrix with maintaining the form of its bulky structure, without being dispersed in the form of single fibers.

Moreover, in the carbon fibrous structure according to the present invention, the carbon fibers are bound together by granular parts formed in the growth process of the carbon fibers. Therefore, the structure itself has remarkably excellent electrical properties, etc. For example, when determining electrical resistance under a certain compression density, the carbon fibrous structure has an extremely low resistance, as compared with the value of, for example, a simple aggregate of carbon fibers or that of the structure in which carbon fibers are fixed at contacting points with a carbonaceous material or its carbide after the synthesis of the carbon fibers. Thus, when the structure according to the invention is incorporated and dispersed into a matrix, good conductive paths can be formed.

In the present description, the embodiment that carbon fibers extend outwardly from granular parts does not indicate the state that a plurality of carbon fibers are seemingly connected to granular parts by other binders (including carbonaceous material), but mainly means the state that a plurality of carbon fibers are connected to granular parts by the bindings like the carbon crystal structure as described above (see FIG. 3).

Furthermore, although it is not particularly limited, it is preferable that the particle diameter of the granular part is larger than the outside diameter of the carbon fiber as shown in FIG. 4. When the particle diameter of the granular part which is a binding site of mutual carbon fibers is sufficiently large like this, high binding force is given with respect to the carbon fibers extending outwardly from the granular part. Therefore, when the carbon fibrous structure is incorporated into a matrix such as a resin, even with applying a substantial shear stress, the carbon fibrous structure can be dispersed into the matrix while maintaining a three-dimensional network structure.

In the carbon fibrous structure according to the present invention, it is preferable that the carbon fibrous structure has an area-based circle-equivalent mean diameter of from about 20 to about 100 μm. The area-based circle-equivalent mean diameter used herein is a value which is determined by taking a picture of the outside shape of the carbon fibrous structure with an electron microscope or the like, tracing the contour of the respective carbon fibrous structure in the obtained picture using a suitable image analysis software such as WinRoof (trade name, manufactured by Mitani Corporation), and determining the area within the contour, calculating the circle-equivalent mean diameter of each individual carbon fibrous structure, and then, averaging the calculated data.

Although it is not to be applied to all cases because the circle-equivalent mean diameter may be influenced by the kind of a matrix material for complex formation, such as a resin, the circle-equivalent mean diameter may serves as a factor for determining the maximum length of the carbon fibrous structure when being incorporated into a matrix such as a resin. In general, when the circle-equivalent mean diameter is less than 20 μm, the electrical conductivity may not be expected to reach a sufficient level. On the other hand, when the circle-equivalent mean diameter exceeds 100 μm, an undesirable increase in viscosity may be expected to happen when incorporating into a matrix by kneading or the like, which may result in difficulty in mixing and dispersion or may result in deteriorated moldability.

Furthermore, the carbon fibrous structure according to the present invention is comprised of carbon fibers that are configured three dimensionally and are bound together by granular parts so that a plurality of the carbon fibers extend outwardly from the granular parts, as described above. Therefore, the structure exhibits a bulky form in which the carbon fibers are present sparsely. Specifically, it is desirable that the bulk density thereof is from 0.001 to 0.05 g/cm$^3$, and more preferably from 0.001 to 0.02 g/cm$^3$. When the bulk density exceeds 0.05 g/cm$^3$, it would become difficult to improve the physical properties of a matrix such as a resin by a small amount addition thereof.

Furthermore, in the carbon fibrous structure according to the present invention, the carbon fibers that are configured three dimensionally are bound together by granular parts produced in the growth process of the carbon fibers as mentioned above. Therefore, the structure itself can enjoy extremely excellent electrical properties, etc. as described above. For example, it is preferable that the powder resistance determined under a constant compression density of 0.8 g/cm$^3$ is 0.02Ω·cm or less, and more preferably from 0.001 to 0.015Ω·cm. If the powder resistance exceeds 0.02Ω·cm, it may become difficult to form good conductive paths when being incorporated into a matrix such as a resin.

Furthermore, in order to enhance the strength and electrical conductivity of the carbon fibrous structure according to the present invention, it is desirable that a graphene sheet which makes up the carbon fiber has few defects. Specifically, for example, the $I_D/I_G$ ratio determined by Raman spectroscopy is preferably 0.2 or less, and more preferably 0.1 or less. Incidentally, in Raman spectroscopic analysis with respect to a large single crystal graphite, only a peak in the vicinity of 1,580 cm$^{-1}$ (G band) appears. A peak in the vicinity of 1,360 cm$^{-1}$ (D band) appears when the crystals are of finite minute sizes or have lattice defects. Therefore, when the intensity ratio between the D band and the G band ($R=I_{1360}/I_{1580}=I_D/I_G$) is a given value or less as mentioned above, it is confirmed that the defect amount in graphene sheet is small.

Furthermore, it is desirable that the carbon fibrous structure according to the present invention has a combustion initiation temperature in air of 800° C. or higher, and more preferably from 800 to 900° C. As described above, the carbon fibrous structure has few defects and the carbon fiber has a predetermined outside diameter. As a result, the carbon fibrous structure has such a high thermal stability.

The expression "less variation" used herein means that in a substance having an area of 10 cm$^2$ or more of a resin composite material having carbon fibers added thereto, when electrical conductivity and various dynamic properties are measured at arbitrary five points inside the area 5 mm apart from four ends of the substance, the measured values are within ±50% of the respective average value. More specifically, this means that the value of ([maximum value (or minimum value)-average value]/average value)×100% for the measurement data is smaller than ±50%.

Although not particularly limited, the carbon fibrous structure having the above-described desirable form can be prepared, for example, as follows.

Basically, an organic compound such as hydrocarbon is chemically thermally decomposed through a CVD process using ultrafine particles of a transition metal as catalysts. A method suitable for producing preferable carbon fibers is that residence time in a formation furnace of carbon fiber nuclei, an intermediate product and fibers as products is made shortened to obtain fibers (hereinafter referred to as a "first intermediate"), and the fibers are further heat-treated at high temperature.

For the synthesis of the first intermediate, a conventionally used CVD process of hydrocarbon etc. is employed, and a mixed liquid of hydrocarbon as a raw material and a catalyst in a given mixing ratio is subjected to evaporation, and hydrogen gas, etc. is introduced into a reaction furnace as a carrier gas.

It is desirable, in the CVD process, to set the conditions such that i) the residence time of carbon in a furnace calculated from material balance is 10 seconds or less; ii) the temperature in a formation furnace is from 800 to 1,300° C. to increase reaction rate; the catalyst and raw material carbon compound are preheated to 300° C. or higher and introduced into the formation furnace in a gas state; and iv) the carbon concentration of a gas in the formation furnace is controlled to a certain concentration (20 vol %) or less.

By following such synthesis procedures, the product obtained is an aggregate having a size of several cm to several tens cm comprising a plurality of carbon fibrous structures (first intermediate) gathered, each having a sparse three-dimensional structure, in which fibers having an average outside diameter of from 100 to 300 nm are mutually bound by granular bodies grown from the catalyst particles as nuclei.

Figure 1:
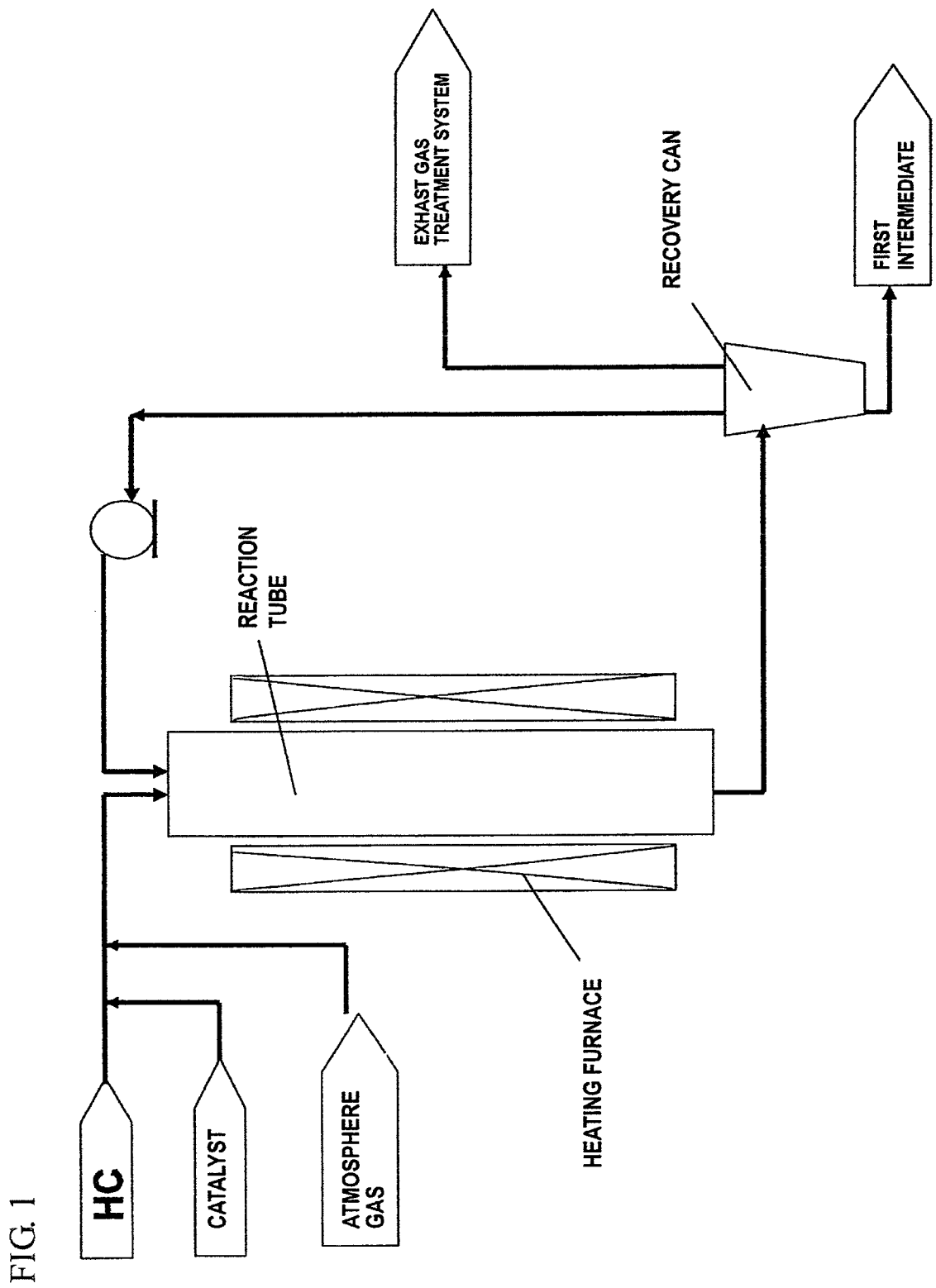
FIG. 1 is a figure schematically showing a synthesis apparatus of a first intermediate of the carbon fibrous structure according to the present invention.

A synthesis apparatus is shown in FIG. 1.

In this synthesis apparatus of carbon fiber, hydrocarbons such as benzene, toluene and xylene; carbon monoxide (CO); and alcohols such as ethanol may be used as a raw material organic compound for carbon fibers. Although it is not particularly limited, it is preferable to use, as carbon sources, at least two carbon compounds which have different decomposition temperatures to obtain the fibrous structure according to the present invention. Further, the words "at least two carbon compounds" used herein include not only the case of using two or more kinds of carbon compounds as raw material organic compounds, but also include the case that one kind of raw material organic compound is used, and it causes a reaction such as hydrodealkylation of toluene or xylene during a synthesis reaction process of the fibrous structure, and this provides two or more carbon compounds having different decomposition temperatures in the subsequent thermal decomposition reaction system.

In the case that at least two kinds of the carbon compounds are made present as carbon sources in the thermal decomposition system, the decomposition temperature of the respective carbon compound varies depending on not only the kind of the carbon compound, but also on gas partial pressure or molar ratio of each carbon compound in the raw material gas. Therefore, as the carbon compound, a relatively large number of combinations can be used by adjusting the composition ratio of the two or more carbon compounds in the raw gas.

For example, two or more kinds of carbon compounds are selected from alkanes or cycloalkanes, such as methane, ethane, propanes, pentanes, hexanes, heptanes, cyclopropane and cyclohexane, particularly, alkanes having from about 1 to 7 carbon atoms; alkenes or cycloolefins, such as ethylene, propylene, butylenes, pentenes, heptenes and cyclopentene, particularly, alkenes having from about 1 to 7 carbon atoms; alkynes such as acetylene and propylene, particularly, alkynes having from about 1 to 7 carbon atoms; aromatic or heteroaromatic hydrocarbons such as benzene, toluene, styrene, xylene, naphthalene, methylnaphthalene, indene and phenanthrene, particularly, aromatic or heteroaromatic hydrocarbons having from about 6 to 18 carbon atoms; alcohols such as methanol and ethanol, particularly, alcohols having from about 1 to 7 carbon atoms; carbon monoxide, ketones and ethers. The two or more carbon compounds can be used in combination by adjusting a gas partial pressure so that those carbon compounds can exhibit different decomposition temperatures within the predetermined thermal reaction temperature range, and/or by adjusting the residence time in a given temperature region. The fibrous structure (first intermediate) can be produced effectively by optimizing the mixing ratio.

Among such combinations of two or more kinds of carbon compounds, for example, in the combination of methane and benzene, it is desirable that a molar ratio of methane/benzene is from 1 to 600, preferably from 1.1 to 200, and more preferably from 3 to 100. This value is a gas composition ratio at the inlet of the reaction furnace. For example, when toluene is used as one of the carbon sources, taking into consideration that toluene is totally decomposed in the reaction furnace to generate 1:1 of methane and benzene, only the deficiency of methane needs to be supplied separately. For example, in the case of adjusting the methane/benzene molar ratio to 3, methane needs to be added in an amount of only 2 moles per mole of toluene. Such methane added to toluene is not always limited to fresh methane separately provided, and it is possible to use unreacted methane contained in an exhaust gas discharged from the reaction furnace by circulation.

By setting the composition ratio within such a range, it is possible to obtain a fibrous structure (first intermediate) having a three-dimensional network structure in which both carbon fiber parts and granular parts are sufficiently developed.

Inert gas such as argon, helium or xenon, or hydrogen may be used as an atmosphere gas.

Further, as the catalyst, a mixture of transition metal such as iron, cobalt or molybdenum, or a transition metal compound such as ferrocene, metal acetate; and sulfur or a sulfur compound such as thiophene or ferric sulfide may be used.

The thermal decomposition reaction of the hydrocarbons as a raw material mainly occurs on the surface of the catalyst particles or on the surface of granular bodies that have grown from the catalyst particles as the nucleus, and the fibrous growth of carbon is achieved when the recrystallization of carbon generated by the decomposition proceeds in a constant direction from the catalyst particles or the granular bodies. However, in the case of obtaining the carbon fibrous structure according to the present invention, the balance between the thermal decomposition rate and the growth rate is intentionally varied. For example, the use of at least two kinds of carbon compounds having different decomposition temperatures as carbon sources as mentioned above allows the carbonaceous material to grow three dimensionally around the granular body as a center, not limiting the growth of the carbonaceous material to only one dimensional direction.

Naturally, the three dimensional growth of the carbon fiber does not depend on only the balance between the thermal decomposition rate and the growing rate, but is also influenced by the selectivity of the crystal face of the catalyst particle, residence time in the reaction furnace, temperature distribution in the reaction furnace and the like. Furthermore, the balance between the thermal decomposition reaction and the growing rate is influenced not only by the kind of the carbon source described above, but also by reaction temperature, gas temperature and the like. In general, when the growing rate is faster than the thermal decomposition rate, the carbonaceous material grows in fibrous shape, and on the other hand, when the thermal decomposition rate is faster than the growing rate, carbonaceous material grows in the circumferential direction of the catalyst particle. Therefore, by intentionally changing the balance between the thermal decomposition rate and the growing rate, it is possible to control the growth direction of carbonaceous material to occur in multi-direction without limiting the growth direction to a single direction, and to produce the three dimensional structure according to the present invention. Regarding the first intermediate formed, in order to easily form the three-dimensional structure in which fibers are mutually bound by the granular body, it is desirable to optimize the compositions of the catalyst, etc., the residence time in the reaction furnace, the reaction temperature and the gas temperature.

With regard to the method for efficiently producing the fibrous structure (first intermediate), there is an approach that the raw material gas supplied into the reaction furnace is forced to form a turbulent flow in proximity to its supply port, in addition to the approach that two or more carbon compounds having different decomposition temperatures are used in an appropriate mixing ratio. The term "turbulent flow" used herein is a furiously irregular flow and means flow with vortexes.

Figure 2:
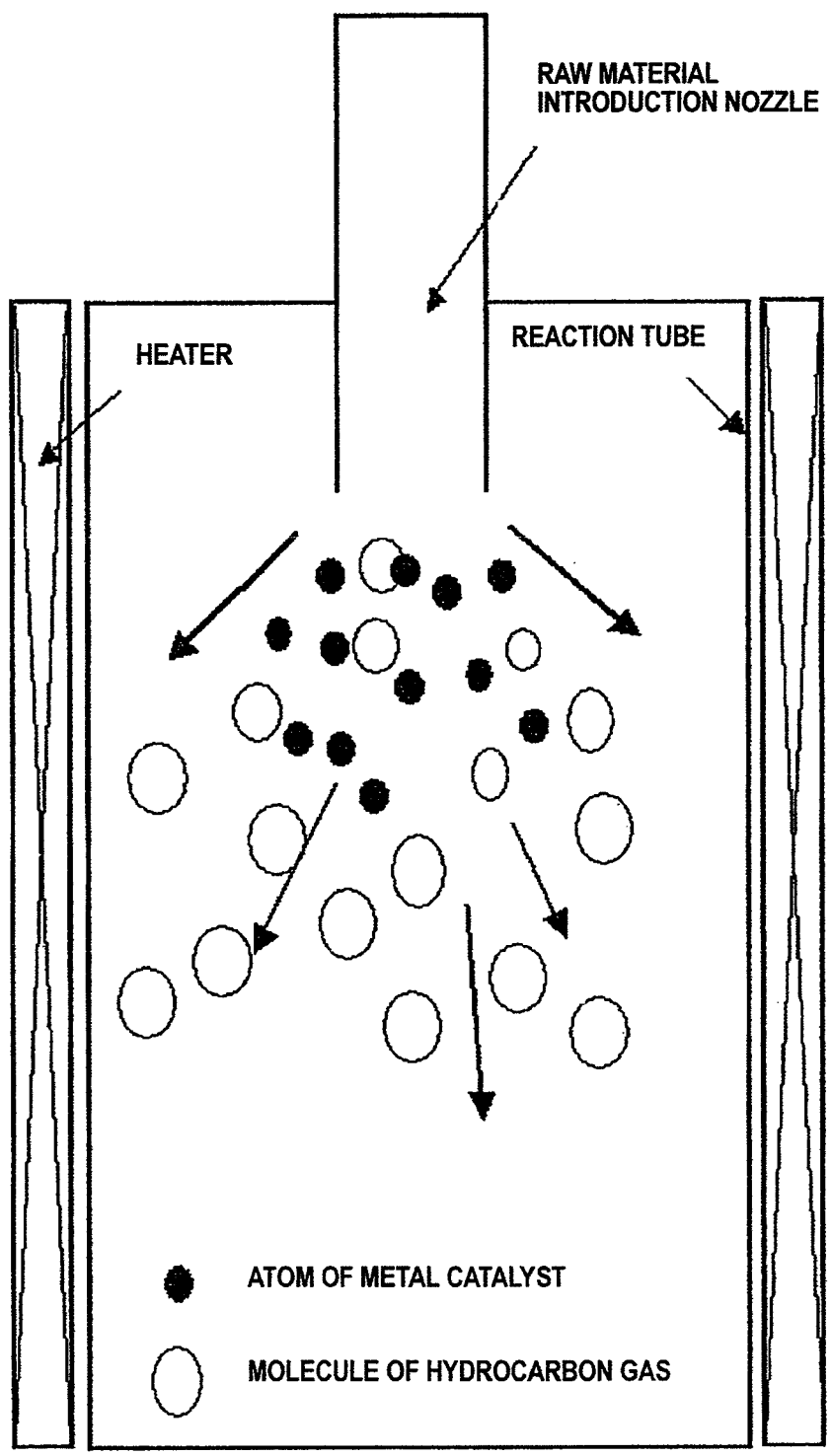
FIG. 2 is a schematic figure regarding flows of raw materials injected from an introduction nozzle in synthesizing a first intermediate of the carbon fibrous structure according to the present invention.

As shown in FIG. 2, in the reaction furnace, immediately after the raw material gas is supplied into the reaction furnace from the raw material introduction nozzle, metal catalyst fine particles are formed by the decomposition of the transition metal compound as the catalyst present in a raw material mixing gas. This is carried out through the following stages. Namely, at first, the transition metal compound is decomposed to form metal atoms, and then a cluster is generated by collision of plural number of, for example, about 100, of metal atoms. In the stage of the cluster thus generated, the cluster does not act as a catalyst for the fibrous structure (first intermediate), and the formed clusters further aggregates by collisions with each other to grow into a metal crystalline particle of about 3 nm to about 50 nm. The crystalline particle comes into use as a metal catalyst fine particle for producing the fibrous structure (first intermediate).

In the catalyst formation process, if the vortex flows due to the furiously turbulent flow are present, further vigorous collision becomes possible as compared with the collision among metal atoms or clusters by Brownian motion only, and the metal catalyst fine particles are obtained within a shorter time and with higher yield by the increase in the number of collision per unit time. Furthermore, since concentration, temperature and the like are uniformized by the vortex flow, metal catalyst fine particles having uniform size can be obtained. Additionally, during the process where the metal catalyst fine particles are formed, an aggregate of metal catalyst fine particles, in which a number of metal crystalline particles gather by vigorous collisions due to vortex flows, is formed. Thus, the metal catalyst fine particles are promptly produced as mentioned above, and the area of the surface of metal catalyst, which is a site for decomposition reaction of a carbon compound, increases. As a result, decomposition of the carbon compound is accelerated so that sufficient carbonaceous material is provided. Thereby, the carbon fibers grow up radially by taking individual metal catalyst fine particles in the aggregate as nucleus. On the other hand, when the thermal decomposition rate of a part of the carbon compound is faster than the growing rate of the carbon material as described above, the carbon material also grows in the circumferential direction of the catalyst particles, thereby forming the granular part around the aggregate. As a result, the fibrous structure (first intermediate) having the desired three-dimensional configuration is formed effectively. Incidentally, it can be considered the possibility that the aggregate of the metal catalyst fine particles may partly contain catalyst fine particles which have a lower activity than the other catalyst fine particles or which have been deactivated in the course of the reaction. It may be thought that the precursor of a granular part is formed by the carbon material layer existing at the circumferential position of the aggregate, which has been grown in a non-fibrous shape or an extremely short fibrous shape on the surface of such catalyst fine particles before the aggregation into aggregates, or grown by taking the catalyst fine particles as nuclei after the formation of aggregates.

Therefore, since the carbon fibers extending outwardly from the reaction catalyst particles which are aggregates of the metal catalyst fine particles use a plurality of metal catalyst fine particles in the aggregate as growing nuclei, plural carbon fibers sterically extend outwardly from one reaction catalyst particle. Metal catalyst fine particles which have a lower activity than the other metal catalyst fine particles or which have been deactivated in the course of the reaction are present in the reaction catalyst particles as described above, and the metal catalyst fine particles grow carbon material in the circumferential direction before, during or after the formation of the aggregate. However, this does not reach the formation of carbon fibers. Therefore, the granular parts comprise the ends of sterically extending carbon fibers and the metal catalyst fine particles around which the carbon material has been grown in only the circumferential direction. The granular portions binding carbon fibers with each other mainly form aggregation and integration embodiments of a plurality of spherical structures rather a simple spherical shape, and the growth of the carbon material is further continued in such a state. Therefore, in combination with the annealing treatment described below, a carbon fibrous structure in which the ends of a plurality of carbon fibers aggregated and integrated in the granular parts and a plurality of adjacent spherical structure form and share a continuous graphene sheet-like layer, and as a result, a plurality of sterically extending carbon fibers are tightly bound at the granular parts, is formed.

The specific means for causing turbulent flow in a raw material gas flow in the vicinity of a raw material gas supply port of the reaction furnace, particularly in a temperature range of from 450 to 1,000° C. which is derived by reaction kinetics and supposed to be generation and formation regions of the metal catalyst fine particles, is not particularly limited. For example, means of introducing a raw material gas in a spiral flow into the reaction furnace or means of providing some collision member at a position being capable of interfering with the raw material gas flow derived from the raw material gas supply port into the reaction furnace may be employed. The shape of the collision section is not limited at all, and it may be any shape so long as a sufficient turbulent flow is formed in the reactor furnace by the vortex flow which is created at the collision section as a starting point. For example, embodiments of disposing one or more of various shapes of baffles, paddles, tapered tubes, umbrella shaped elements and the like, singly or in combination of two or more thereof, can be employed.

The first intermediate, obtained by heating a mixed gas of the catalyst and hydrocarbon at a constant temperature in the range of from 800 to 1,300° C., has a (half-baked state, incomplete) structure such that patch-shaped sheet pieces of carbon atoms are laminated each other. When analyzed with Raman spectroscopy, the D band of the first intermediate is very large, and many defects are observed. Furthermore, the first intermediate thus generated contains unreacted raw materials, non-fibrous carbides, tar ingredient and catalyst metal.

Therefore, the first intermediate is subject to heat treatment at high temperature of from 2,400 to 3,000° C. by an appropriate method in order to remove those residues from the first intermediate and obtain the intended carbon fibrous structure with few defects.

Specifically, for example, the first intermediate is heated at 800 to 1,200° C. to remove the unreacted raw materials and volatile portion such as the tar ingredient (the carbon fibrous structure from which the unreacted raw materials and volatile portion such as the tar ingredient have been removed is hereinafter referred to as a "second intermediate"), and then subjected to annealing treatment at high temperature of from 2,400 to 3,000° C. to produce the intended structure and, simultaneously, to evaporate and remove the catalyst metal contained in the fibers. In this case, a reducing gas or a small amount of carbon monoxide gas may be added into the inert gas atmosphere to protect the material structure.

When the first or second intermediate is subjected to annealing treatment at a temperature in a range of from 2,400 to 3,000° C., patch-shaped sheet pieces of carbon atoms are bound with each other to form a plurality of graphene sheet-like layers.

It is preferable that the carbon fibers obtained by the annealing treatment have few defects in the graphene sheet constituting carbon fibers in order to exhibit high strength and electrical conductivity as the carbon fibrous structure according to the present invention. However, from the standpoint of cutting the fibers, it is desirable that the defects are moderately present. Specifically, for example, it is desirable that the $I_D/I_G$ ratio measured by Raman spectroscopy is 0.2 or less, and the $I_G/I_G$ is from 0.6 to 1.2. It is also preferable that the G' band of the carbon fibers is substantially bilaterally symmetric. Although the origin of the G' band is not clear, it is considered that the G' band comes to show bilateral symmetry by that the graphene sheet takes a cylindrical form. Furthermore, it is considered that carbon fibers with low D band intensity and high G' band intensity have few defects. It is considered that when the intensity ratio between the D band and the G band ($R=I1360/I1580=I_D/I_G$) and the intensity ratio between the G' band and the G band ($I2700/I1580=I_G/I_G$) fall within the given ranges as mentioned above, the amount of defects in the graphene sheet is small and is moderate for selective cutting treatment of defective portions.

The "defect" used herein means an incomplete portion (lattice defect) in the arrangement of graphene sheet constituting carbon fibers, generated, e.g., by entry of unnecessary atoms as impurities, shortage of necessary carbon atoms, or generation of deviation.

Furthermore, before or after such a heat treatment at a high temperature, a carbon fibrous structure having the desired circle-equivalent mean diameter is obtained through a crushing treatment to reduce the circle-equivalent mean diameter of the carbon fibrous structure to several centimeters, and a pulverization treatment to reduce the average diameter of the circle-equivalent mean diameter of the crushed carbon fibrous structure to 20 to 100 μm. The pulverization treatment may be conducted without the crushing treatment. Furthermore, an aggregate comprising the plural carbon fibrous structures according to the present invention may be granulated for adjusting its shape, size or bulk density to suitable one(s) for application. More preferably, in order to effectively utilize the structure formed during the reaction, it is further effective, for imparting electric conductivity to a resin, to perform the annealing treatment in a state of low bulk density (a state where the fibers fully extend as much as possible and the voidage is high).

The carbon fibrous structure according to the present invention has the following properties.

A) a low bulk density;
B) good dispersibility into a matrix such as a resin;
C) a high electrical conductivity;
D) a high heat conductivity;
E) good slidability;
F) good chemical stability;
G) high thermal stability;
H) small variations in physical values such as electrical conductivity when added into a resin, etc. Utilizing those properties, the carbon fibrous structure can be used in a wide range as filler for composite material with respect to solid materials such as organic polymers, inorganic materials and metals, or as an additive to liquid materials such as fuels and lubricating oils.

Examples of the organic polymers include various thermoplastic resins such as polypropylene, polyethylene, polystyrene, polyvinyl chloride, polyacetal, polyethylene terephthalate, polycarbonate, polyvinyl acetate, polyamide, polyamideimide, polyether imide, polyether ether ketone, polyvinyl alcohol, polyphenylene ether, poly (meth)acrylate and liquid crystal polymer; various thermosetting resins such as epoxy resin, vinyl ester resin, phenolic resin, unsaturated polyester resin, furan resin, imide resin, urethane resin, melamine resin, silicone resin and urea resin; and various elastomers such as natural rubber, styrene/butadiene rubber (SBR), butadiene rubber (BR), isoprene rubber (IR), ethylene/propylene rubber (EPDM), nitrile rubber (NBR), chloroprene rubber (CR), butyl rubber (IIR), urethane rubber, silicone rubber, fluorine rubber, acryl rubber (ACR), epichlorohydrin rubber, ethylene acryl rubber, norbornene rubber and thermoplastic elastomer.

Moreover, the organic polymers may be a form of various compositions such as adhesives, fibers, coating materials and inks.

In other words, the matrix may be, for example, adhesives such as epoxy adhesive, acrylic adhesive, urethane adhesive, phenolic adhesive, polyester adhesive, vinyl chloride adhesive, urea adhesive, melamine adhesive, olefinic adhesive, vinyl acetate adhesive, hot melt adhesive, cyanoacrylate adhesive, rubber adhesive and cellulose adhesive; fibers such as acrylic fiber, acetate fiber, aramide fiber, nylon fiber, novoloid fiber, cellulose fiber, viscose rayon fiber, vinylidene fiber, vinylon fiber, fluorine fiber, polyacetal fiber, polyurethane fiber, polyester fiber, polyethylene fiber, polyvinyl chloride fiber and polypropylene fiber; or coating materials such as phenolic resin paint, alkyd resin paint, epoxy resin paint, acrylic resin paint, unsaturated polyester paint, polyurethane paint, silicone paint, fluorine resin paint and synthetic resin emulsion paint.

The inorganic material comprises, for example, a ceramic material or an inorganic oxide polymer. Preferable examples of the inorganic material include carbon materials such as carbon-carbon composite; glasses, glass fibers, sheet glasses, other molded glasses, silicate ceramics and other refractory ceramics such as aluminum oxide, silicon carbide, magnesium oxide, silicon nitride and boron nitride.

In the case that the matrix is a metal, examples of suitable metal include aluminum, magnesium, lead, copper, tungsten, titanium, niobium, hafnium, vanadium and their alloys and mixtures.

The composite material of the present invention may contain other additives in addition to the carbon fibrous structure described above. Examples of the additives include metal fine particles, silica, calcium carbonate, magnesium carbonate, carbon black, glass fibers, and carbon fibers. Those additives can be used singly or in combination of two or more thereof.

When specific examples of the composite materials are to be shown on the basis of function, the following can be exemplified. However, as a matter of course, the invention is not limited thereto.

1) One Utilizing Electrical Conductivity

A conductive resin and a conductive resin molded body, obtained by mixing with a resin, are suitably used as wrapping material, gasket, container, resistance body, conductive fiber, electric wire, adhesive, ink, paint and the like. In addition to the composite material with a resin, similar effects can be expected as well in the case of composite materials obtained when added to materials such as an inorganic material, particularly ceramic and metal, and etc..

2) One Utilizing Heat Conductivity

In addition to the above embodiment wherein electrical conductivity is utilized, it is also possible to add to fuels in order to increase heat conductivity.

3) One Utilizing Electromagnetic Wave Shielding Properties

By mixing with a resin, the resulting resin can be suitably used as an electromagnetic wave shielding paint or as an electromagnetic wave shielding material by molding.

4) One Utilizing Physical Properties

By mixing with a resin or a metal to increase sliding ability, the resulting material is used for rollers, brake parts, tires, bearings, lubricating oils, cogwheels, pantographs and the like.

Furthermore, by taking advantage of its light-weight and tough properties, it can be used in electric wires, bodies of consumer electronics, vehicles, airplanes, etc., and housing of machines.

Other than the above, it can be used in place of the conventional carbon fibers or beads, and can be utilized in, for example, polar materials of batteries, switches and vibration dampers.

5) One Utilizing of Thermal Stability

In order to increase the safety of flammable liquids such as fuels, lubricating oils, etc., during storage or transportation, it is added to the flammable liquids.

EXAMPLES

Hereinafter, the present invention will be illustrated in detail with reference to Examples. However, the present invention is not limited thereto.

The respective physical values illustrated below were measured as follows.

<Measurement of Average Outside Diameter>

A photograph of aggregates of carbon fibers was taken with SEM (magnification: 35,000 to 50,000). Based on the SEM photograph obtained, the diameter of one fiber in the aggregate of the carbon fibers was determined using the image analysis software, WinRoof (trade name, manufactured by Mitani Corporation) in a direction perpendicular to the extending direction of the fiber, and the value obtained was used as an outside diameter of the carbon fiber. Using all aggregates of the carbon fibers which could be taken as objects in one field of view (approximately, 60 to 80 pieces), about 200 pieces of the carbon fibers in total were taken as objects in three fields of views. In this case, only carbon fibers having a clear contour in the aggregate were taken as objects. The average diameter of the carbon fiber outside diameter was calculated based on those data.

<Area Based Circle-Equivalent Mean Diameter>

First, a photograph of a carbon fibrous structure was taken with SEM. In the SEM photograph obtained, only the carbon fibrous structures having a clear contour were taken as objects. Deformed carbon fibrous structures had an unclear contour, and were therefore eliminated from the objects. Using all the carbon fibrous structures which could be taken as objects in one field of view (approximately 60 to 80 pieces), about 200 pieces of the carbon fibrous structures in total were taken as objects in three fields of views. The contour of each of the carbon fibrous structures taken as objects was traced using the image analysis software WinRoof (trade name, manufactured by Mitani Corporation), and the area in the contour was determined. The circle-equivalent diameter of each fibrous structure was calculated therefrom, and the obtained values were averaged.

<Measurement of Bulk Density>

1 g of powder was put into a 70 mm-caliber transparent cylinder equipped with a distribution plate. Then, 1.3 liter volume of air with 0.1 MPa pressure was supplied from a part below the distribution plate to blow off the powder and to allow the powder to settle naturally. After the fifth air blowing, the height of the powder layer after sedimentation was measured. The measurement points were 6 points, and the average of the 6 points was determined to calculate the bulk density.

<Raman Spectroscopic Analysis>

The Raman spectroscopic analysis was performed with LabRam 800, manufactured by HORIBA JOBIN YVON, S.A.S., using argon laser having a wavelength of 514 nm.

<TG Combustion Temperature>

Using TG-DTA, manufactured by MAX SCIENCE CO., LTD., combustion behavior was measured while flowing air at a flow rate of 0.1 liter/min and elevating temperature at a rate of 10° C./min. When burning, TG indicates a weight reduction, and DTA indicates an exothermic peak. Therefore, the top position of the exothermic peak was defined as the combustion initiation temperature.

<X Ray Diffraction>

Using the powder X ray diffraction equipment (JDX3532, manufactured by JEOL Ltd), carbon fibrous structure after annealing treatment was examined. Kα ray generated with Cu tube at 40 kV and 30 mA was used. The measurement of the interlayer spacing was performed in accordance with the method defined by The Japan Society for the Promotion of Science (JSPS), described in "Latest Experimental Technique For Carbon Materials (Analysis Part)", Edited by Carbon Society of Japan". Silicon powder was used as an internal standard.

<Powder Resistance and Decompressibility>

1.0 g of powder of carbon fibrous structures was scaled, and then press-loaded into a resinous die (inner dimensions: 40 liters, 10 W, 80 Hmm), and the displacement and load were read out. A constant current was flown by the four-terminal method, and the voltage at this time was measured. After measuring the voltage until the density came to 0.9 g/cm³, the pressure was released, and the density after decompression was measured. Regarding the powder resistance, resistances when the powder was compressed to 0.5, 0.8 and 0.9 g/cm³ were measured.

By the CVD process, carbon fibers were synthesized using toluene as a raw material.

A mixture of ferrocene and thiophene was used as a catalyst. The mass ratio between the catalyst and carbon in the raw material was 150:1, a raw material gas introduction rate into a reaction furnace was 1,300 NL/min, and pressure was 1.03 atm. The synthesis reaction was carried out under the reducing atmosphere of hydrogen gas. Toluene and the catalyst were heated to 380° C. together with the hydrogen gas, and then supplied to a formation furnace, and thermal decomposition was carried out at 1,250° C. Thus, a carbon fibrous structure (first intermediate) was obtained. Concerning the outside diameter distribution of the carbon fibers, the minimum diameter was 102 nm and the maximum diameter was 296 nm. The average outside diameter was 136 nm. The synthesized first intermediate was annealed at 900° C. in nitrogen to remove hydrocarbons such as tar and to obtain a second intermediate. The R value of the second intermediate measured by Raman spectroscopic analysis was found to be 0.98. A sample for electron microscope was prepared by dispersing the first intermediate into toluene. SEM photo and TEM photo of the sample are shown in FIGS. 3 and 4, respectively.

Further, a high temperature heat treatment of the second intermediate was carried out at 2,600° C. in argon, and the obtained aggregates of the carbon fibrous structures were pulverized by an air flow pulverizer. Thus, a carbon fibrous structure according to the present invention was obtained.

Figure 5:
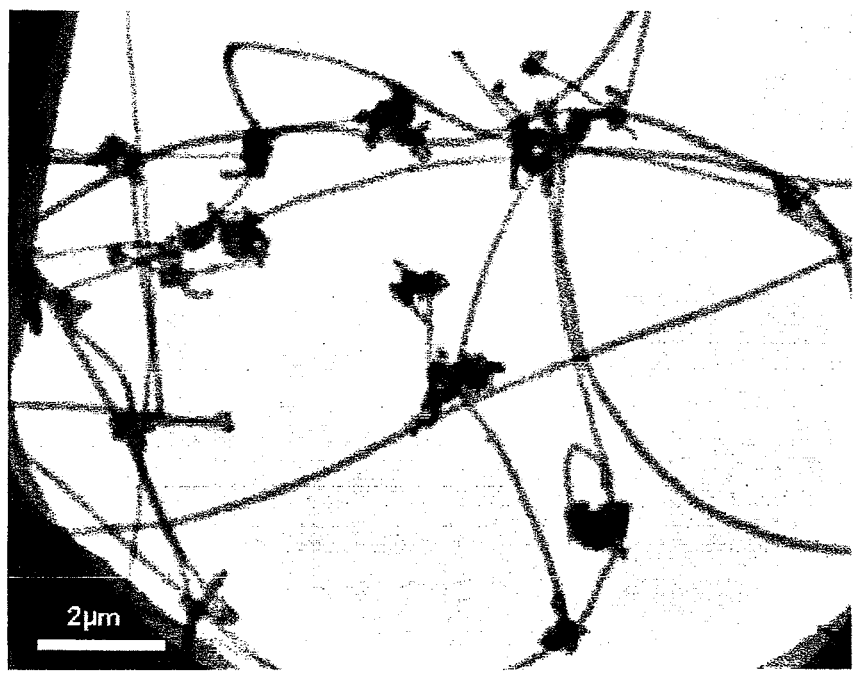
FIG. 5 is a SEM photograph of a carbon fibrous structure according to the present invention.
Figure 6:
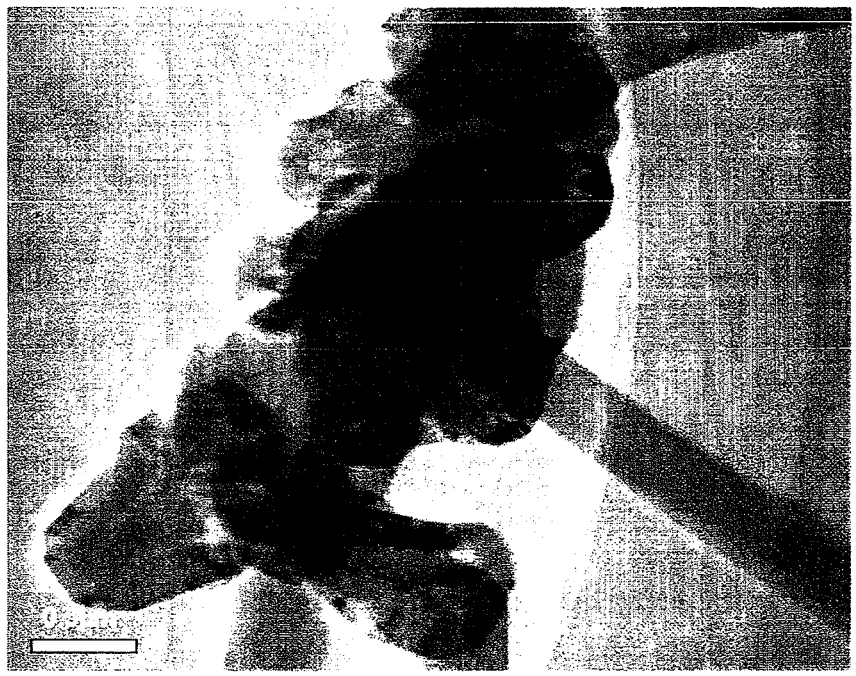
FIG. 6 is a TEM photograph of a carbon fibrous structure according to the present invention.

A sample for electron microscope was prepared by dispersing the thus obtained carbon fibrous structure into toluene with ultrasonic. SEM photo and TEM photo of the sample are shown in FIGS. 5 and 6, respectively.

Figure 7:
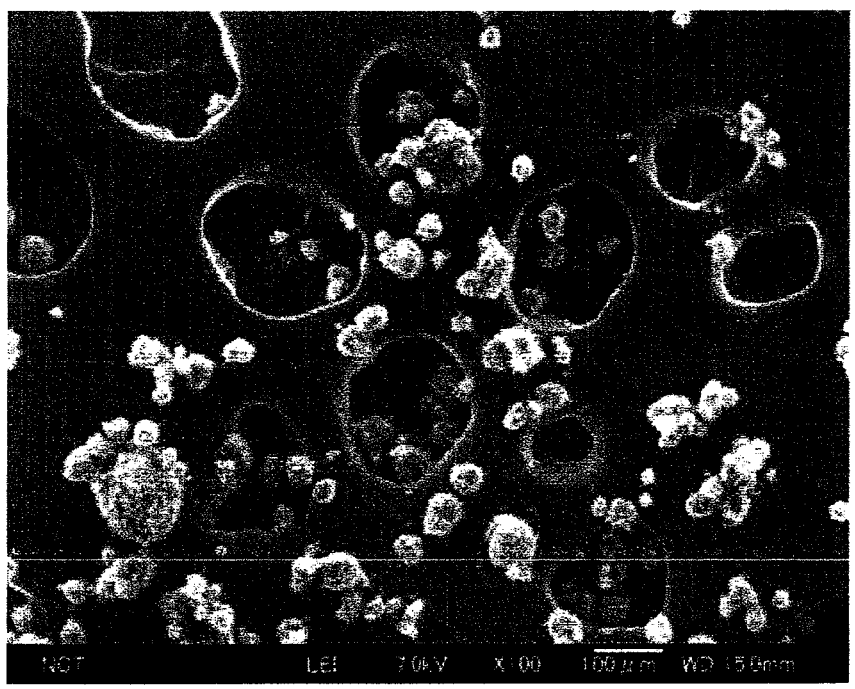
FIG. 7 is a SEM photograph of a carbon fibrous structure according to the present invention.

SEM photo observed by placing the obtained carbon fibrous structure on a sample holder for electron microscope is shown in FIG. 7, and the particle diameter distribution thereof is shown in Table 1.

Figure 8:
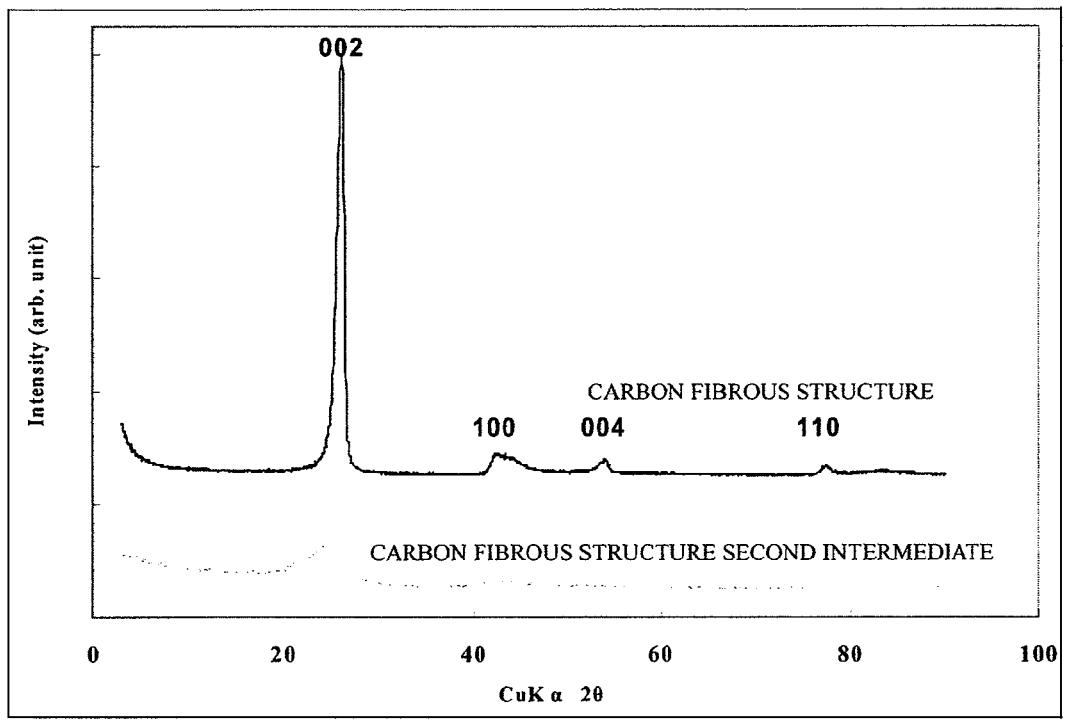
FIG. 8 is a X-ray diffraction chart of a carbon fibrous structure according to the present invention and of a second intermediate of the carbon fibrous structure.
Figure 9:
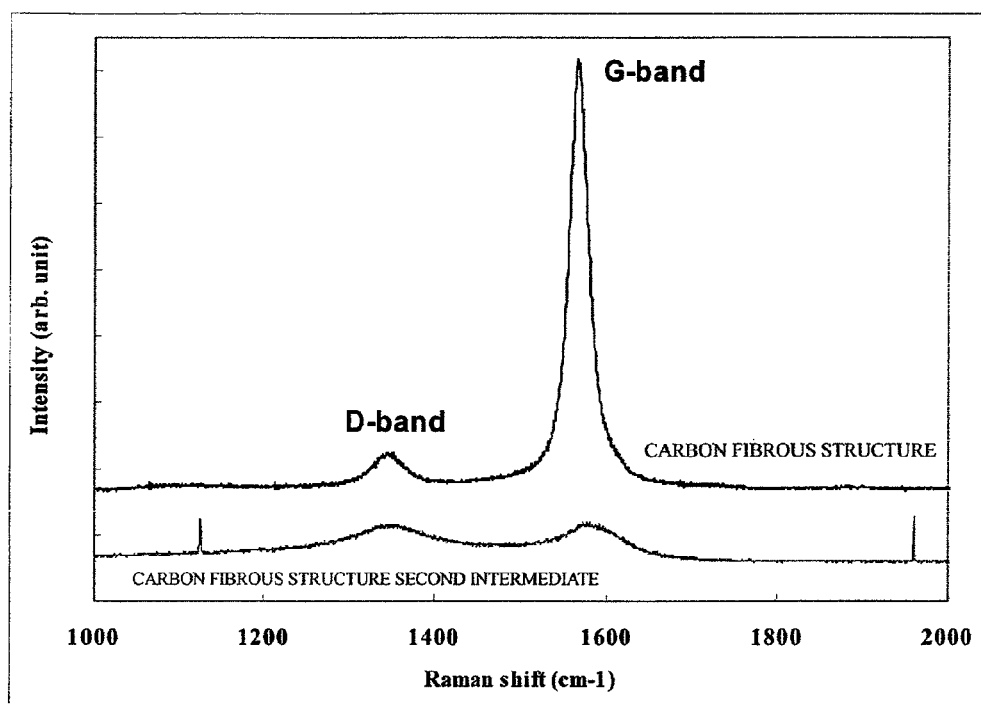
FIG. 9 is a Raman spectroscopic analysis chart of a carbon fibrous structure according to the present invention and of a second intermediate of the carbon fibrous structure.

Further, X-ray diffraction and Raman spectroscopic analysis of the carbon fibrous structure were conducted before and after the high temperature heat treatment, and changes therebetween were examined. The results are shown in FIG. 8 and FIG. 9, respectively.

Additionally, the obtained carbon fibrous structure had a circle-equivalent mean diameter of 45.8 μm, a bulk density of 0.0057 g/cm³, a Raman $I_D/I_G$ ratio value of 0.094, a TG combustion temperature of 832° C., an interlayer spacing of 3.384 angstroms, a powder resistance of 0.0122Ω·cm, and a density after decompression of 0.18 g/cm³.

Moreover, 0.22 g of the obtained carbon fibrous structure was added to 10 g of an epoxy resin (ADEKA RESIN, EP 4100E, epoxy equivalent: 190, manufactured by Asahi denka Co., Ltd.), and a hardener (ADEKA HARDENER EH3636-AS, manufactured by Asahi denka Co., Ltd.) so as to adjust the content of the carbon fibrous structure to be 2.0% by mass. The resulting mixture was kneaded with a rotation-revolution type centrifugal force stirring machine (AWATORI RENTARO, AR-250, manufactured by THINKY) for 10 minutes. Thus, an epoxy resin kneaded material of the carbon fibrous structure of the present invention for the measurement of viscosity was prepared.

COMPARATIVE EXAMPLE

Fine carbon fibrous structures having an outside diameter distribution of from 40 to 90 nm were synthesized by the method disclosed in Patent Document 1. The physical property values were nearly the same as the values disclosed in Patent Document 1. In the same manner as in the Example, the fine carbon fibrous structures were added to an epoxy resin so that the content of the fine carbon fibrous structures became 2.0% by mass.

Viscosities (Complex Viscosity) of 2.0% by mass mixtures of the fine carbon fibrous structures of each of the Example and the Comparative Example in an epoxy resin were measured using a high performance rotational rheometer (Gemini 150, manufactured by Bhlin Instruments) at a temperature of 25° C. and a frequency in a range of from 0.01 to 10 Hz with the Auto-stress mode. The results obtained are shown in FIG. 10.

Figure 10:
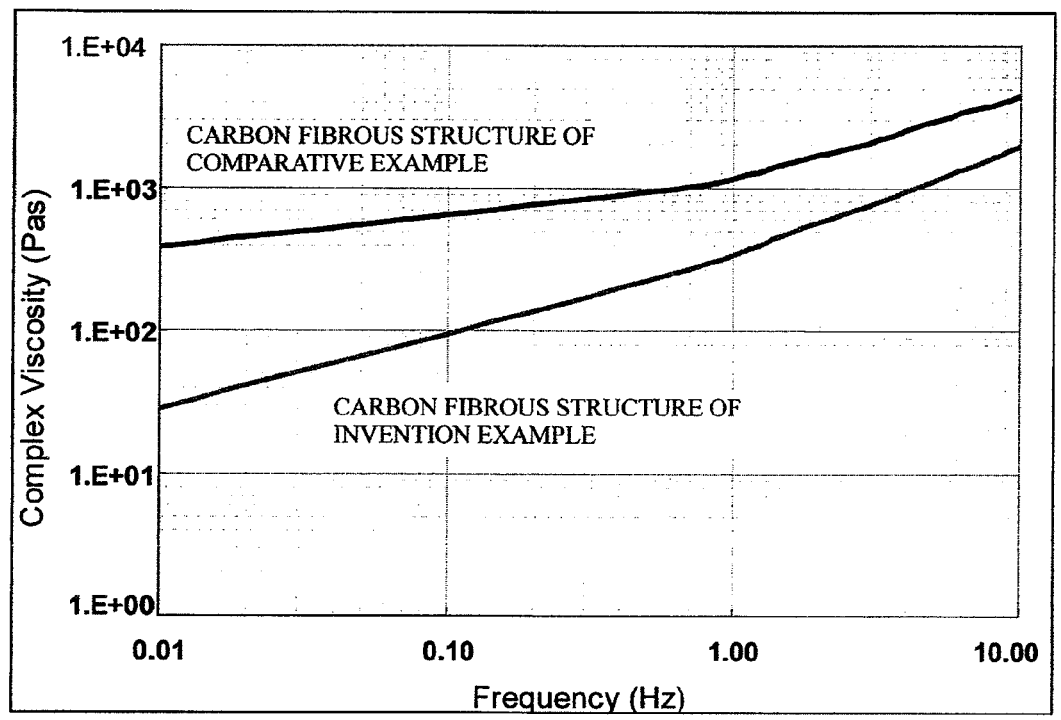
FIG. 10 shows results of viscosity measurement according to the present invention.
Figure 11:
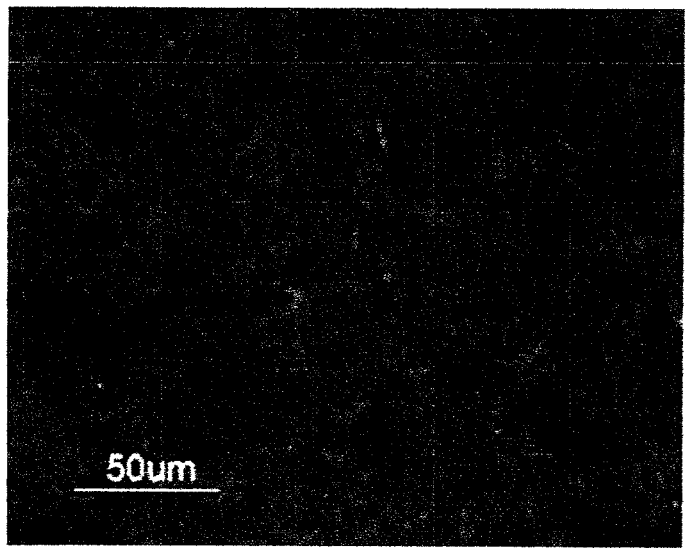
FIG. 11 is an optical micrograph of a composite material using a carbon fibrous structure according to the present invention.

As is seen from FIG. 10, the viscosity of the mixture of the carbon fibrous structures of the present invention and the epoxy resin is lower than that of the fine carbon fibrous structures of the Comparative Example, which suggests that easy dispersion is attained with lower dispersion energy.

Further, an epoxy resin film was formed in a similar manner, so as to have a content of the carbon fibrous structure of the present invention of 0.5% by mass. The optical micrograph of the obtained film is shown in FIG. 9. This photograph clearly shows that the carbon fibrous structures of the present invention exhibit good dispersibility in the resin matrix.

A polycarbonate resin (PANLITE L-1225L, manufactured by Teijin Chemicals Ltd.) and the carbon fibrous structures obtained in the Example or the fine carbon fibrous structures obtained in the Comparative Example were melt-mixed with the formulation shown in Table 3 by a vented twin-screw extruder (TEM35, manufactured by Toshiba Machine Co., Ltd.) to produce pellets. The obtained pellets were dried at 120° C. for 10 hours, and injection molded under the given molding conditions (280° C., mold temperature: 60° C.) to obtain test pieces (size: 80 mm length, 50 mm width, 3 mm thickness; area: 4,000 mm$^2$). The surface resistances of the test pieces were measured using Loresta GP (Model MCP-T600, manufactured by Mitsubishi Chemical Corporation) and Hiresta UP (Model MCP-HT450, manufactured by Mitsubishi Chemical Corporation) according to the measurement position and measurement method by referring to JIS K 7194 (resistivity test method by a four-prove method of conductive plastic). The results are shown in Table 3.

It is seen from Table 3 that the surface resistance of the test piece using the carbon fibrous structure of the present invention has a variation ([maximum value (or minimum value)-average value]/average value)×100% of approximately within ±50 or less.

The values of various physical properties measured in the Example are shown in Table 2.

TABLE 1

| Particle diameter distribution (pieces) | Example |
|---|---|
| Less than 30 μm | 31 |
| 30 μm to less than 40 μm | 214 |
| 40 μm to less than 50 μm | 258 |
| 50 μm to less than 60 μm | 202 |
| 60 μm to less than 70 μm | 106 |
| 70 μm to less than 80 μm | 42 |
| 80 μm to less than 90 μm | 23 |
| 90 μm to less than 100 μm | 12 |
| 100 μm or more | 11 |
| Circle-equivalent mean diameter | 45.8 μm |

TABLE 2

| Physical property | Example |
|---|---|
| Circle-equivalent mean diameter (μm) | 45.8 |
| Bulk density (g/cm$^3$) | 0.0057 |
| $I_D/I_G$ ratio (—) | 0.094 |
| TG combustion temperature (° C.) | 832 |
| Interlayer Spacing for (002) (angstroms) | 3.384 |
| Powder resistance (at 0.5 g/cm$^3$) | 0.1390 (Ω · cm) |
| Powder resistance (at 0.8 g/cm$^3$) | 0.0122 (Ω · cm) |
| Powder resistance (at 0.9 g/cm$^3$) | 0.0104 (Ω · cm) |
| Density after decompression (g/cm$^3$) | 0.18 |

TABLE 3

| Carbon fibrous structure | Example | | | Comparative Example | | |
|---|---|---|---|---|---|---|
| Addition amount (wt %) | 6.0 | 7.0 | 8.0 | 6.0 | 7.0 | 8.0 |
| Surface resistance 1 (Ω/□) | 2.1E+05 | 6.4E+04 | 4.4E+04 | 2.5E+04 | 7.7E+03 | 1.8E+04 |
| Surface resistance 2 (Ω/□) | 1.6E+05 | 3.7E+04 | 4.4E+04 | 4.2E+04 | 7.9E+03 | 6.3E+03 |
| Surface resistance 3 (Ω/□) | 2.0E+05 | 4.5E+04 | 4.0E+04 | 1.5E+08 | 5.1E+04 | 1.8E+03 |
| Surface resistance 4 (Ω/□) | 1.6E+05 | 6.8E+04 | 4.4E+04 | 7.7E+03 | 6.9E+03 | 1.4E+02 |
| Surface resistance 5 (Ω/□) | 2.0E+05 | 4.5E+04 | 4.0E+04 | 7.9E+03 | 2.1E+02 | 3.8E+02 |
| Average value of surface resistance (Ω/□) | 1.9E+05 | 5.2E+04 | 4.3E+04 | 2.9E+07 | 1.5E+04 | 5.4E+03 |
| (Maximum value − average value)/ average value × 100% | 11.6% | 31.7% | 4.5% | 399.7% | 245.5% | 240.3% |
| (Minimum value − average value)/ average value × 100% | −16.4% | −27.8% | −6.2% | −100.0% | −98.6% | −97.4% |

While the present invention has been described in detail and with reference to specific embodiments thereof, it will be apparent to one skilled in the art that various modifications or changes can be made therein without departing from the spirit and scope thereof.

This application is based on Japanese Patent Application No. 2008-175194 filed on Jul. 4, 2008, the disclosure of which is incorporated herein by reference.

Industrial Applicability

According to the present invention, it becomes possible to provide a carbon fibrous structure having good dispersibility and small variation in electrical conductivity, etc., and being capable of improving physical properties such as electrical properties, mechanical properties and thermal properties by a small amount addition thereof without impairing properties of a matrix, thereby making it possible to apply the carbon fibrous structure to electronic parts and high performance composite materials.

The invention claimed is:

1. A carbon fibrous structure having a three-dimensional network shape and comprising carbon fibers having an average outside diameter of from 136 to 300 nm,
    wherein the carbon fibrous structure has a plurality of granular parts, and has at least partially a steric network structure of the carbon fibers in a state that a plurality of the carbon fibers sterically extend outwardly from the granular parts and that the extending carbon fibers are also bound with other granular parts;
    wherein the granular parts that bind the carbon fibers together have a particle diameter larger than an outside diameter of the carbon fiber, and are formed in a growth process of growing a carbon material in the circumferential direction of catalyst particles used while growing the carbon material into a fibrous shape, by using at least two carbon compounds having different decomposition temperatures as carbon sources, and
    wherein the carbon fibrous structure has a powder resistance of $0.02\Omega \cdot cm$ or less measured at a compression density of $0.8\ g/cm^3$.

2. The carbon fibrous structure according to claim 1, having an area-based circle-equivalent mean diameter of from 20 to 100 μm.

3. The carbon fibrous structure according to claim 1 or 2, having a bulk density of from 0.001 to $0.05\ g/cm^3$.

4. The carbon fibrous structure according to any one of claims 1 to 3, having $I_D/I_G$ determined by Raman spectroscopy of 0.2 or less.

5. The carbon fibrous structure according to any one of claims 1 to 4, having a combustion initiation temperature in air of 800° C. or higher.

6. A composite material comprising a matrix and aggregates of the carbon fibrous structure described in any one of claims 1 to 5 incorporated into the matrix in an amount of from 0.1 to 50% by mass based on the total mass.

7. The composite material according to claim 6, wherein the matrix comprises at least an organic polymer.

8. The composite material according to claim 7, wherein the matrix comprises at least an inorganic material.

9. The composite material according to claim 8, wherein the matrix comprises at least a metal.

10. The composite material described in any one of claims 6 to 9, wherein the matrix further comprises at least one additive selected from the group consisting of metal fine particles, silica, calcium carbonate, magnesium carbonate, carbon black, glass fibers and carbon fibers.

11. The carbon fibrous structure according to claim 1, wherein the carbon fibers have an average outside diameter of from 136 nm to 200 nm.

* * * * *